United States Patent
Wartena et al.

(10) Patent No.: US 10,409,241 B2
(45) Date of Patent: *Sep. 10, 2019

(54) ADAPTIVE ENERGY STORAGE OPERATING SYSTEM FOR MULTIPLE ECONOMIC SERVICES

(71) Applicant: Growing Energy Labs, Inc., San Francisco, CA (US)

(72) Inventors: Ryan Craig Wartena, San Francisco, CA (US); Ernest Crispell Wagner, San Francisco, CA (US)

(73) Assignee: Growing Energy Labs, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/729,193

(22) Filed: Oct. 10, 2017

(65) Prior Publication Data

US 2018/0203424 A1 Jul. 19, 2018

Related U.S. Application Data

(63) Continuation of application No. 13/898,283, filed on May 20, 2013, now Pat. No. 9,817,376.

(60) Provisional application No. 61/649,278, filed on May 19, 2012.

(51) Int. Cl.
*G05D 3/12* (2006.01)
*G05B 15/02* (2006.01)
*H02J 4/00* (2006.01)
*H02J 15/00* (2006.01)

(52) U.S. Cl.
CPC ............ *G05B 15/02* (2013.01); *H02J 4/00* (2013.01); *H02J 15/00* (2013.01)

(58) Field of Classification Search
CPC ...... H02J 3/28; Y02T 10/7005; Y02T 90/128; Y02E 10/563; Y02E 70/30; Y02E 10/566; Y04S 30/14; Y04S 10/14; Y04S 10/30; Y04S 10/545; Y04S 30/12; Y04S 40/12; Y04S 50/16; G06F 9/4411; G06F 13/102; G06F 9/4413; G06F 9/4415; G05B 15/02
See application file for complete search history.

(56) References Cited

U.S. PATENT DOCUMENTS

| | | | |
|---|---|---|---|
| 6,985,799 B2 * | 1/2006 | Zalesski | H02J 1/102 307/62 |
| 7,274,975 B2 | 9/2007 | Miller et al. | |
| 7,385,373 B2 * | 6/2008 | Doruk | F01K 13/00 320/107 |

(Continued)

FOREIGN PATENT DOCUMENTS

| | | |
|---|---|---|
| WO | WO-2013039554 A1 | 3/2013 |
| WO | WO-2014078336 A1 | 5/2014 |
| WO | WO-2016019278 A1 | 2/2016 |

OTHER PUBLICATIONS

Notice of Allowance dated Jul. 19, 2017 for U.S. Appl. No. 13/898,283.

(Continued)

*Primary Examiner* — Darrin D Dunn
(74) *Attorney, Agent, or Firm* — Wilson Sonsini Goodrich & Rosati

(57) ABSTRACT

The present disclosure provides an adaptive energy storage operating system that is programmed or otherwise configured to operate and optimize various types of energy storage devices.

16 Claims, 2 Drawing Sheets

(56) References Cited

U.S. PATENT DOCUMENTS

| | | | |
|---|---|---|---|
| 7,490,175 B2 | 2/2009 | Rosenbloom et al. | |
| 7,612,466 B2* | 11/2009 | Skutt | B60L 11/1842 307/29 |
| 8,294,286 B2* | 10/2012 | Hunter | F02D 29/06 290/1 A |
| 8,548,635 B2 | 10/2013 | Watson et al. | |
| 8,600,571 B2 | 12/2013 | Dillon et al. | |
| 8,791,665 B2* | 7/2014 | Davis | H01M 10/48 320/106 |
| 8,855,829 B2 | 10/2014 | Golden et al. | |
| 8,874,772 B2 | 10/2014 | Boldt | |
| 8,886,362 B2* | 11/2014 | Krok | G05F 5/00 700/291 |
| 8,922,063 B2* | 12/2014 | Taddeo | H02J 1/12 307/82 |
| 8,957,623 B2* | 2/2015 | Sisk | H01M 2/1072 320/101 |
| 9,292,803 B2* | 3/2016 | Kalogridis | H02J 3/14 |
| 9,817,376 B1 | 11/2017 | Wartena et al. | |
| 2002/0184304 A1 | 12/2002 | Meade et al. | |
| 2004/0044442 A1 | 3/2004 | Bayoumi et al. | |
| 2004/0113588 A1 | 6/2004 | Mikuriya et al. | |
| 2004/0220758 A1 | 11/2004 | Barsoukov et al. | |
| 2004/0230343 A1* | 11/2004 | Zalesski | H02J 1/102 700/297 |
| 2004/0254899 A1 | 12/2004 | Abe et al. | |
| 2006/0038660 A1 | 2/2006 | Doumuki et al. | |
| 2006/0158037 A1 | 7/2006 | Danley et al. | |
| 2006/0259255 A1 | 11/2006 | Anderson et al. | |
| 2007/0005192 A1* | 1/2007 | Schoettle | H02J 3/32 700/286 |
| 2007/0067413 A1* | 3/2007 | Nishio | G06F 9/4411 709/217 |
| 2007/0143045 A1 | 6/2007 | MacGregor et al. | |
| 2007/0168576 A1* | 7/2007 | Rosenbloom | G06F 9/4411 710/15 |
| 2007/0266121 A1 | 11/2007 | Saeed et al. | |
| 2008/0046387 A1 | 2/2008 | Gopal et al. | |
| 2008/0167756 A1* | 7/2008 | Golden | G05B 15/02 700/297 |
| 2008/0211230 A1* | 9/2008 | Gurin | B60K 6/28 290/2 |
| 2008/0262820 A1 | 10/2008 | Nasle et al. | |
| 2008/0276257 A1* | 11/2008 | Fuchs | H04L 41/0806 719/327 |
| 2008/0281663 A1* | 11/2008 | Hakim | B60L 11/1824 705/7.25 |
| 2009/0189456 A1* | 7/2009 | Skutt | B60L 11/1842 307/87 |
| 2009/0273313 A1 | 11/2009 | Scott et al. | |
| 2009/0278498 A1* | 11/2009 | Lai | H02J 7/00 320/128 |
| 2010/0262312 A1 | 10/2010 | Kubota et al. | |
| 2010/0301810 A1* | 12/2010 | Biondo | H04Q 9/00 320/155 |
| 2011/0082598 A1* | 4/2011 | Boretto | G06Q 10/06 700/291 |
| 2011/0099264 A1* | 4/2011 | Chapin | H04L 41/12 709/224 |
| 2011/0119687 A1* | 5/2011 | McGovern | G06F 9/4415 719/327 |
| 2011/0204720 A1* | 8/2011 | Ruiz | B60L 11/1816 307/66 |
| 2011/0258471 A1 | 10/2011 | Daniel et al. | |
| 2011/0289517 A1* | 11/2011 | Sather | G06F 9/4411 719/321 |
| 2012/0029716 A1 | 2/2012 | Sekoguchi et al. | |
| 2012/0029897 A1 | 2/2012 | Cherian et al. | |
| 2012/0046795 A1* | 2/2012 | Kelty | B60L 11/1857 700/291 |
| 2012/0046798 A1* | 2/2012 | Orthlieb | H02J 3/32 700/297 |
| 2012/0049516 A1 | 3/2012 | Viassolo | |
| 2012/0053750 A1 | 3/2012 | Viassolo et al. | |
| 2012/0059527 A1 | 3/2012 | Beaston et al. | |
| 2012/0059532 A1 | 3/2012 | Reifenhauser et al. | |
| 2012/0068540 A1 | 3/2012 | Luo et al. | |
| 2012/0083930 A1 | 4/2012 | Ilic et al. | |
| 2012/0089261 A1 | 4/2012 | Kim | |
| 2012/0101639 A1 | 4/2012 | Carralero et al. | |
| 2012/0109403 A1 | 5/2012 | Shelton et al. | |
| 2012/0109797 A1 | 5/2012 | Shelton et al. | |
| 2012/0109798 A1 | 5/2012 | Shelton et al. | |
| 2012/0116955 A1 | 5/2012 | Prosser et al. | |
| 2012/0117411 A1 | 5/2012 | Stanley-Marbell | |
| 2012/0146585 A1 | 6/2012 | Darcy | |
| 2012/0173873 A1* | 7/2012 | Bell et al. | H04L 9/321 713/156 |
| 2012/0189878 A1 | 7/2012 | Basson et al. | |
| 2012/0200160 A1* | 8/2012 | Pratt | H01M 10/44 307/48 |
| 2012/0235624 A1* | 9/2012 | Sisk | H01M 2/1072 320/101 |
| 2012/0242148 A1* | 9/2012 | Galati | H02J 3/14 307/39 |
| 2012/0248873 A1 | 10/2012 | Oudalov et al. | |
| 2012/0253527 A1 | 10/2012 | Hietala et al. | |
| 2012/0280573 A1 | 11/2012 | Ohkura et al. | |
| 2012/0280694 A1 | 11/2012 | Song et al. | |
| 2012/0296482 A1 | 11/2012 | Steven et al. | |
| 2012/0331202 A1* | 12/2012 | Cohen | G06F 13/102 710/313 |
| 2013/0041517 A1* | 2/2013 | Nelson | H02J 3/28 700/292 |
| 2013/0073104 A1* | 3/2013 | Sciacchitano | H02J 3/28 700/295 |
| 2013/0093246 A1 | 4/2013 | Rostami | |
| 2013/0096728 A1* | 4/2013 | Steffes | H02J 3/14 700/291 |
| 2013/0117767 A1* | 5/2013 | Myrah | G06F 13/102 719/326 |
| 2013/0158725 A1 | 6/2013 | Anderson et al. | |
| 2013/0245847 A1 | 9/2013 | Steven et al. | |
| 2013/0261803 A1 | 10/2013 | Kolavennu | |
| 2013/0274935 A1 | 10/2013 | Deshpande et al. | |
| 2014/0006807 A1 | 1/2014 | Oglesby et al. | |
| 2014/0015469 A1 | 1/2014 | Beaston et al. | |
| 2014/0018971 A1 | 1/2014 | Ellis et al. | |
| 2014/0039709 A1 | 2/2014 | Steven et al. | |
| 2014/0039710 A1 | 2/2014 | Carter et al. | |
| 2014/0052396 A1 | 2/2014 | Jin et al. | |
| 2014/0129040 A1 | 5/2014 | Emadi et al. | |
| 2014/0129197 A1 | 5/2014 | Sons et al. | |
| 2014/0172503 A1 | 6/2014 | Hammerstrom et al. | |
| 2014/0277794 A1 | 9/2014 | Kaufman et al. | |
| 2014/0278617 A1 | 9/2014 | Kaufman et al. | |
| 2014/0330611 A1 | 11/2014 | Steven et al. | |
| 2016/0036272 A1 | 2/2016 | Wartena et al. | |

OTHER PUBLICATIONS

Office action dated Jan. 4, 2016 for U.S. Appl. No. 13/898,283.
Office Action dated Mar. 24, 2017 for U.S. Appl. No. 13/898,283.
Office Action dated Sep. 8, 2016 for U.S. Appl. No. 13/898,283.
U.S. Appl. No. 14/814,510 Office Action dated Mar. 4, 2019.
PCT/US2015/043177 International Search Report and Written Opinion dated Nov. 9, 2015.
U.S. Appl. No. 14/814,510 Office Action dated Feb. 21, 2018.
U.S. Appl. No. 14/814,510 Office Action dated Jul. 27, 2017.
U.S. Appl. No. 14/814,510 Office Action dated Jun. 7, 2018.

* cited by examiner ial patent application was specifically and individu-
ADAPTIVE ENERGY STORAGE OPERATING SYSTEM FOR MULTIPLE ECONOMIC SERVICES

CROSS-REFERENCE

This application is a Continuation Application of U.S. application Ser. No. 13/898,283, filed May 20, 2013 which claims priority to U.S. Provisional Patent Application Ser. No. 61/649,278, filed on May 19, 2012, which is entirely incorporated herein by reference.

BACKGROUND

Energy storage devices or systems are capable of storing energy in various forms (e.g., mechanical, chemical, electrochemical, potential, electrical) for later release and use for individual, multiple and/or simultaneous applications. Their operation can be controlled and managed.

SUMMARY

The present disclosure provides a software operating system to operate, optimize and network energy storage systems for multiple value streams. Energy operating systems of the present disclosure can coordinate the components of an energy storage system to capture value from any number of services that the energy storage system can provide individually and/or as a networked configuration. The energy operating system can operate locally as an embedded system on the energy storage system and/or on external servers.

In some situations, the core of the energy operating system is an energy computing module to optimize the operation of the energy storage system based on adaptive rules and algorithms for each of the services. The inputs to the rules and algorithms are exterior pricing signals, communications signals, rate structures, electrical system status, electrical system forecast and operator preferences. The outputs are adaptive operational signals for energy storage system hardware components and/or peripheral devices, energy and economic data, including control signals for other devices and reporting functions.

The software can be designed or implemented as an operating system. The operating system can be modular. The appropriate energy services for the site and desired functions can be installed, updated and maintained as a computer program or application. Further, the library structure of the energy operating system can allow any energy storage system hardware component and/or peripheral electrical devices to be integrated with drivers, thereby not requiring changes in the energy services. Additionally, the library stucture can include operational libraries based upon evolving standards, which can be designed or otherwise configured to be updated without affecting other modules of the energy operating system. Finally, the database architecture of the energy operating system can have a private side for system operations and a public side for the storage, acquisition, publishing and broadcasting of energy availability data, energy operation data, economic data and operational signals.

An aspect of the present disclosure provides a system for automating, managing and/or monitoring an energy storage system. The system comprises a plurality of drivers, a set of libraries, and a plurality of applications. Each driver among the plurality of drivers can be programmed to enable communication with an energy storage system upon execution by a computer processor. Each library among the set of libraries, upon execution by a computer processor, can implement energy-related data transformations and/or energy-related data calculations using input from the energy storage system, wherein the input is provided with the aid of a given driver among the plurality of drivers that is selected for the energy storage system. Each application among the plurality of applications can be selectable by an operator of the system to perform an energy- and/or economic-related function using input from the energy storage system that is provided with the aid of the given drivers and libraries.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." or "FIGS." herein) of which:

DETAILED DESCRIPTION

Figure 1:
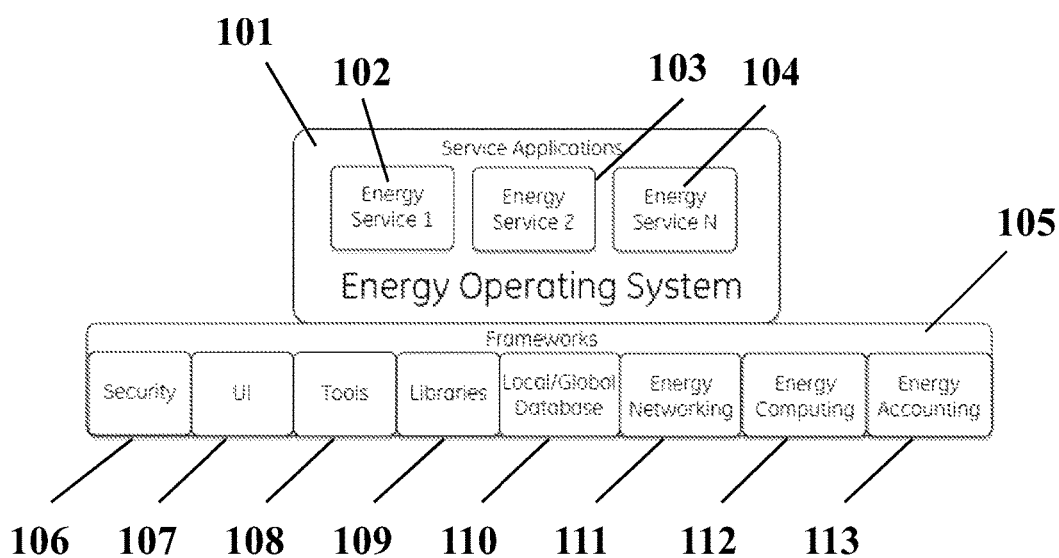
FIG. 1 schematically illustrates system architecture and framework for an energy operating system with multiple adaptive energy services for the optimal operation of energy storage systems for multiple value streams, in accordance with various embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

An aspect of the disclosure provides a system comprising an adaptive energy storage operating system (also "adaptive operating system" or "energy operating system" herein). The system can include an adaptive energy storage operating system that is programmed or otherwise configured to communicate with an energy storage system, and its components (e.g., power conversion system, battery management system, electrical meters, electrical relays, etc.) and optimize the operation of the energy storage system, such as, for example, based on adaptive rules and algorithms.

The system can comprise one or more device drivers, each configured to operate or control a given energy storage device. A given driver can be a program that can run on the system to operate or control an energy storage device or energy storage system component. The driver can communicate with the energy storage device through a computer bus of the system or communications subsystem that is connected to the energy storage device. The driver can enable sophisticated communication of data (e.g., automation, algorithmic control) between the device and the system. In some cases, the driver may interface with or one or more industrial control systems, such as, for example, one or more device-specific drivers. The driver may utilize one or more communication or control protocols. The driver can communicate with various types of devices (e.g., devices requiring different communication or control protocols) such that devices can interface with the system in a plug and play fashion. The drivers of the present disclosure can enable the system to interface to numerous types of drivers and devices. In some embodiments, the drivers of the present disclosure can be selected by a user, automatically detected upon connection of a device, or a combination thereof. The drivers can enable one or more devices to be integrated with the adaptive operating system without affecting the remainder of the adaptive operating system.

In some examples, a system comprises an adaptive energy storage operating system. A user couples the system to an energy storage system, and the adaptive energy storage operating system automatically recognizes the type of energy storage system and configures the system for use with the energy storage system. As an alternative, an operator can configure the system for use with the energy storage system by selecting appropriate drivers.

In some examples, when a calling program (e.g., an energy management program or an energy service application) of the system invokes a routine in the energy operating system core and/or in a driver of the system, the driver issues one or more commands to the energy storage device. Once the energy storage device sends data back to the driver, the driver can invoke routines in the original calling program.

A driver can be hardware-dependent and operating-system-specific. The driver can provide interrupt handling required for any necessary asynchronous time-dependent hardware interface. The driver can enable the system to interface with a power conversion system and/or a battery management system of an energy storage system.

The system can further include one or more libraries. A library can be a collection of implementations of behavior, written in terms of a language that can have a well-defined interface by which the behavior is invoked. The library can be used by any one of a plurality of programs of the system. A given library can include reference materials for the system.

The system can include a plurality of libraries. In some examples, the system includes a utility rate structure library, a smart grid communication protocol library and a manufacturer operating parameters library. A given library can perform or be used to perform actions, transformations and calculations with various operating energy storage device operating parameters. In some cases, an application can be configured to perform such actions, transformations and calculations.

The system can include applications that are programmed or otherwise configured to run on the adaptive operating system. An application can be selected by an operator of an energy storage device for various uses. An application can be provided for various functions (e.g., actions, transformations, calculations) or energy services, such as, for example, detecting energy storage device charge, ancillary services, optimum demand charge management, time of use shifting, demand shifting, demand response, electric vehicle charging.

Libraries and/or applications can perform actions, provide limitations on system parameters, transform and calculate data and operation signals, and generate commands for drivers to deliver to energy storage system devices and components. In some cases, the core of the energy operating system can perform the calculations. The drivers can translate and relay communications and control signals.

FIG. 1 shows a system 100 comprising an energy operating system 101, in accordance with various embodiments of the present disclosure. The energy operating system 101 includes one or more energy service applications 102, 103, 104 each corresponding to one or more functions or energy services. Examples of functions of energy storage services include, without limitation, demand charge management, time of use shifting, demand response, ancillary services, energy capacity, electric vehicle charging, spinning reserve capacity, ramp rate service, renewable energy firming, frequency regulation, voltage regulation, transformer unloading and management, peaking power, emergency and backup power services, and power quality services. The energy operating system 101 can comprise software for implementing the applications 102, 103, 104. The energy operating system can be implemented on a computer system (e.g., system 200 in FIG. 2). The system can be implemented locally (e.g., at a site of an energy storage device). Software can run different applications locally. In some cases, the system can communicate with one or more other systems over a network. In some cases, the energy operating system can be implemented locally and centrally (e.g., at a central site controlling multiple energy storage devices).

In some embodiments, the system 100 can include various frameworks 105 for building the applications 102, 103, 104. The frameworks 105 can be separate from the energy operating system 101. As an alternative, the frameworks 105 can be included in the energy operating system 101. For example, the energy operating system 101 can include a security framework 106, which can comprise security protocols and data protection hardware and software, such as, for example, firewall, active event alerts and authentication software. The energy operating system 101 can include a user interface (UI) framework 107, including, for example, software and graphical tools for implementing a graphical user interface and a communications interface for interfacing with one or more devices, networks, or other systems. The system can further include various tools 108, including, but not limited to, tools for building drivers, tools for setting permissions (e.g., user access level, clearance, permission to override automatic control, permission to export or report data), tools for creating user accounts etc.

The energy operating system 101 can further include one or more libraries 109. The libraries can include reference data or reference materials, such as, for example, utility rate structures. The reference data can be for local economic values and operational parameters to be utilized in applications, algorithms, and programs. The utility rate structures can include local economic rate information for supply and demand on a power basis and on a total energy basis. In some cases, the libraries comprising different reference materials can be provided separately. In other cases, one or more libraries can be combined and/or integrated.

Further information which may be stored in libraries can include statistical data, exterior pricing signals, communications signals, rate structures, electrical system status and operator preferences. In some embodiments, such data can be included in one or more databases 110. The databases 110 can be local (e.g., on site and accessible over a network), global (e.g., centrally maintained and locally accessible over a network), or a combination thereof (e.g., a copy of a database can be maintained locally in addition to a global database). Further, the databases 110 can have a public portion (e.g., available to one or more users over a network or published or reported externally) and a private portion (e.g., available for system operation, to one or more users of the energy operating system, or monitoring data saved for troubleshooting purposes). The data in the databases 110 can include, for example, device-level data, usage and performance data and energy and economic data.

In an example, the libraries 109 can further include one or more drivers. The drivers can enable different devices to be plugged in and integrated with the system locally without affecting other parts of the system (e.g., without affecting applications implemented by the system). The drivers enable hardware (e.g., energy storage devices) to be integrated with the energy operating system in an abstract fashion.

The frameworks 105 can further include an energy networking framework 111 and an energy computing framework 112. The energy networking framework 111 can include, for example, software, tools, methods and/or protocols for communication between energy operating systems; for arranging, conditionally aggregating operations, coordinating and managing energy operating systems and energy storage devices over a network; for calculating, analyzing and balancing energy streams among the energy devices; and for storing or delivering energy from the energy storage devices (e.g., in coordination with a grid operator). The energy computing framework 112 can include, for example, software, tools, methods and/or protocols for measuring, calculating, transforming and monitoring operations, performance, generation, storage, delivery and distribution of energy in one or more energy storage devices. The frameworks 111, 112 (or any of the frameworks 105) can include algorithms and logic that may alternatively be included in one or more of the applications of the energy operating system 101. The frameworks 111 and 112, or any of the frameworks 105, can include commands, algorithms and logic for interfacing or calling another framework. For example, the energy computing framework 112 can include the capability to interface with, request information from and submit commands to one or more drivers. Thus, when one of the applications of the energy operating system is implemented, it can employ one or more frameworks, and each framework can provide functionality needed for implementing the application. Various levels of functionality may be distributed across applications and frameworks to streamline execution across various applications of the energy operating system. For example, functionality may be modularly arranged or organized to streamline co-optimization across applications, as described in more detail elsewhere herein.

The energy operating system 101 can be a modular software system. For example, the applications 102, 103, 104 and libraries and drivers 109 can be added on to the system module by module (e.g., device by device, application program by application program). In some cases, other frameworks 106, 107, 108, 110, 111, 112, 113 can be modular. The core 101 of the system 100 can include an energy computing module for optimizing the operation of the energy storage system based on adaptive rules and algorithms for each of the services (e.g., services implemented by applications 102, 103, 104). The co-optimization across applications can be implemented in accordance with one or more objectives of the energy operating system, such as, for example, an objective based on economic considerations (e.g., maximization of profit, maximization of capacity factor), or an objective based on reliability considerations. Thus, the energy operating system can be used to coordinate the components of an energy storage system (or multiple networked energy storage systems) to capture value from the energy services provided using the energy operating system (e.g., energy service implemented with the energy service applications).

The implementation of the applications can lead to various outputs, such as, for example, adaptive operational signals (e.g., control signals) for energy storage system hardware components and/or peripheral devices (e.g., communicated to devices using the drivers of the system).

The outputs can include reporting functions. The reporting functions can be implemented as one or more applications in conjunction with one or more frameworks 105, such as, for example, the library 109, the database 110, an energy accounting framework 113, and or other modules. The energy accounting framework 113 can include an economic interface, including generating stadardized economic reports, calculating economic parameters and indicators, performing statistical analysis, performing economic projections and forecasts etc. In some examples, the reporting functions can be generated automatically within a database (e.g., programmed database) or implemented within a library. The present disclosure provides hardware for implementing operating systems provided herein. The hardware can be dedicated for use with energy storage systems or shared for the operation of other energy system components and functions.

Figure 2:
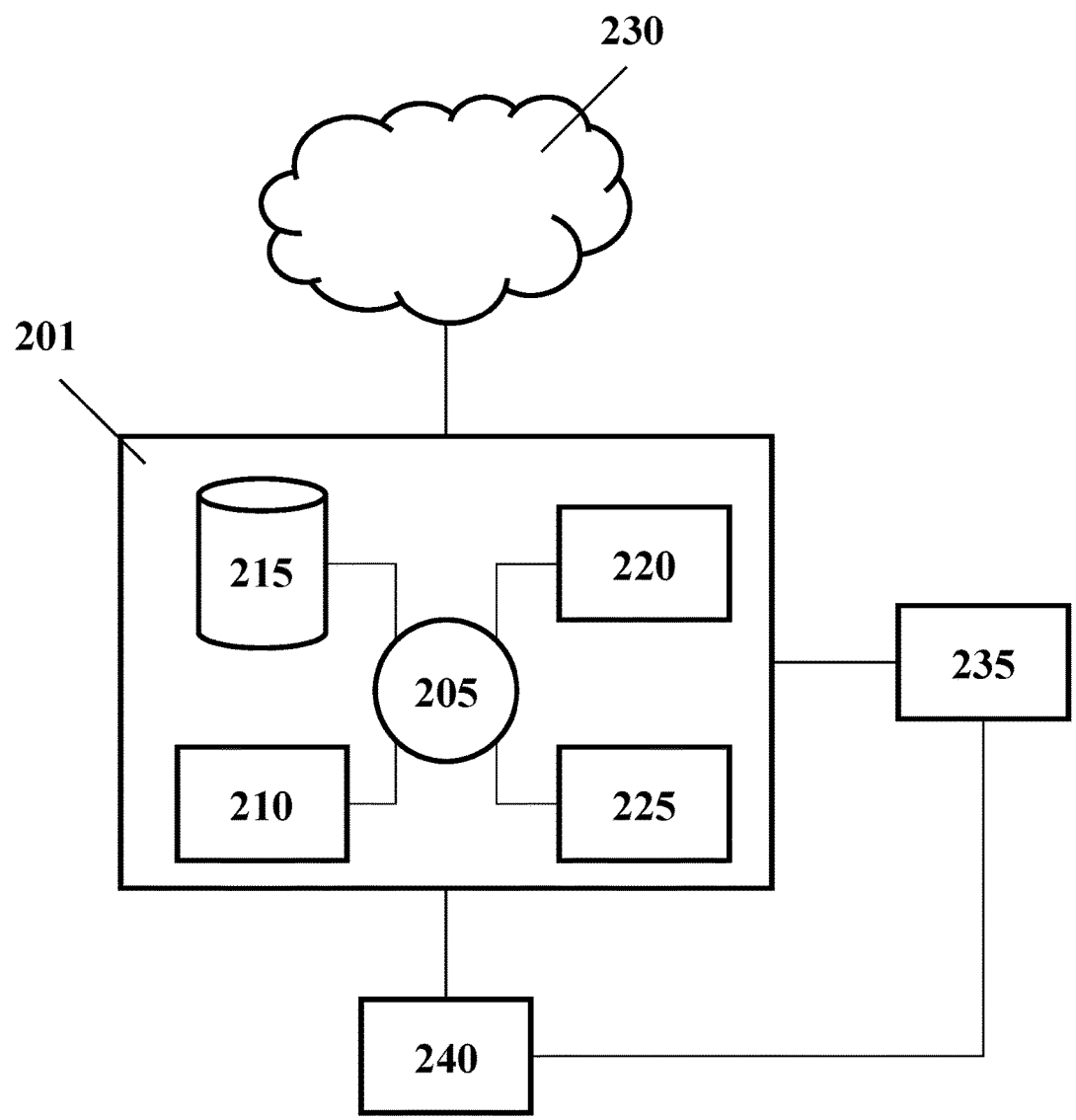
FIG. 2 schematically illustrates a system comprising an adaptive energy storage operating system, in accordance with various embodiments of the present disclosure.

FIG. 2 shows a system 200 comprising a computer system (or server) 201 with an adaptive energy storage operating system, in accordance with various embodiments of the present disclosure. The server 201 includes a central processing unit (CPU, also "processor" and "computer processor" herein) 205, which can be a single core or multi core processor, or a plurality of processors for parallel processing. The server 201 also includes memory 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The server 201 can be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the server 201, can implement a peer-to-peer network, which may enable devices coupled to the server 201 to behave as a client or a server.

The server 201 can include an operating system with a program that is configured to interface with a load, such as an energy storage device or power grid, a power meter or a power converter. The server 201 is configured to communicate with various types of energy storage devices and/or power generation systems, such as batteries, hydroelectric devices, wind turbines, photovoltaic systems, geothermal systems, nuclear power plants, and the power grid. The server 201 includes drivers for communicating with various types of energy storage devices, power meters and/or power converters, libraries for performing various functions, and applications for permitting a user to perform various user-specific functions in the context of energy storage. The server 201 in some cases is exclusively dedicated to energy storage. In some cases, the operating system of the server 201 includes no more than the features (e.g., drivers, libraries) that are required to permit the server 201 to be used to manage, operate, monitor and/or optimize energy storage devices and power generation systems.

The server 201 is in communication with an energy storage or power generation system 235, such as a battery (e.g., solid state battery, electrochemical battery), power grid, renewable energy source (e.g., wind turbine, photovoltaic system, geothermal system, wave energy system). The server 201 can be in communication with other load 240, such as a power grid (e.g., smart grid) or local loads (e.g., lighting systems, heating/cooling systems, computing systems). The server 201 can be in communication with a power meter, power relay, or a power converter. The energy storage or power generation system 235 can be coupled to the load 240 for distribution/transmission of energy between the energy storage or power generation system 235 and the load 240.

Aspects of systems and methods described herein may be implemented with the aid of a computer processor, or implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discreet logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. The data and/or instructions can be embodied in non-transitory tangible computer-readable media. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., TCP, UDP, HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs. Systems and methods described herein may be provided to a user via a graphical user interface.

Systems and methods of the present disclosure may be combined with and/or modified by other systems and methods, such as, for example, systems and/or methods described in U.S. Patent Publication No. 2006/0259255 ("METHOD OF VISUALIZING POWER SYSTEM QUANTITIES USING A CONFIGURABLE SOFTWARE VISUALIZATION TOOL"), U.S. Patent Publication No. 2012/0109798 ("METHODS AND APPARATUS FOR MANAGING RENEWABLE ENERGY SERVICES FOR FIXED AND MOBILE ASSETS"), U.S. Patent Publication No. 2012/0109403 ("METHODS AND APPARATUS FOR MANAGING ENERGY SERVICES FROM A PLURALITY OF DEVICES"), U.S. Patent Publication No. 2012/0101639 ("MICROGRID CONTROL SYSTEM"), U.S. Patent Publication No. 2012/0083930 ("ADAPTIVE LOAD MANAGEMENT: A SYSTEM FOR INCORPORATING CUSTOMER ELECTRICAL DEMAND INFORMATION FOR DEMAND AND SUPPLY SIDE ENERGY MANAGEMENT"), U.S. Patent Publication No. 2012/0117411 ("ENERGY CAPTURE OF TIME-VARYING ENERGY SOURCES BY VARYING COMPUATIONAL WORKLOAD"), U.S. Patent Publication No. 2012/0116955 ("CHARGING PURCHASES TO UTILITY ACCOUNTS"), U.S. Patent Publication No. 2012/0109797 ("METHODS AND APPARATUS FOR RECONCILIATION OF A CHARGING EVENT"), U.S. Patent Publication No. 2012/0089261 ("GRID CONNECTED POWER STORAGE SYSTEM AND INTEGRATION CONTROLLER THEREOF"), U.S. Patent Publication No. 2012/0068540 ("ENERGY STORAGE SYSTEM FOR BALANCING LOAD OF POWER GRID"), U.S. Patent Publication No. 2012/0059532 ("METHOD AND DEVICE FOR THE DIRECTIONAL TRANSMISSION OF ELECTRICAL ENERGY IN AN ELECTRICITY GRID"), U.S. Patent Publication No. 2012/0059527 ("DISTRIBUTED ENERGY STORAGE SYSTEM, AND APPLICATIONS THEREOF"), U.S. Patent Publication No. 2012/0053750 ("OPTIMIZATION OF ENERGY STORAGE DEVICE USAGE IN WIND ENERGY APPLICATIONS"), U.S. Patent Publication No. 2012/0049516 ("METHOD, SYSTEM, AND COMPUTER PROGRAM PRODUCT TO OPTIMIZE POWER PLANT OUTPUT AND OPERATION"), U.S. Patent Publication No. 2012/0046795 ("METHOD AND APPARATUS FOR EXTENDING LIFETIME FOR RECHARGEABLE STATIONARY ENERGY STORAGE DEVICES"), U.S. Patent Publication No. 2012/0029897 ("DYNAMIC DISTRIBUTED POWER GRID CONTROL SYSTEM"), and U.S. Patent Publication No. 2012/0029716 ("SUPERVISORY CONTROL METHOD AND EQUIP- MENT FOR SMART GRIDS"), each of which is entirely incorporated herein by reference.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A system for managing and adaptively optimizing an energy storage system, comprising:
    a plurality of subsystems, wherein each subsystem is configured to be implemented locally and adaptive to multiples types of energy storage components of the energy storage system, and wherein each subsystem comprises: one or more processors, and memory comprising a set of instructions executable by the one or more processors to cause the subsystem to:
    detect a physical connection to an energy storage component of the energy storage system;
    communicate, via a given driver among a plurality of drivers stored locally within the subsystem, with the energy storage system, wherein the driver is automatically selected for the energy storage system upon a detection of a connection to an energy storage component of the energy storage system;
    access a set of libraries, wherein each library among the set of libraries, upon execution by the one or more processors, implements energy-related data transformations and energy-related data calculations using input from the energy storage system, wherein the input is provided with the aid of the given driver; and
    perform, by selecting an application from a plurality of applications, (i) an energy-related function or economic-related function using input from the energy storage system that is provided with the aid of the given driver, and (ii) optimization of the energy storage system based on adaptive rules and algorithms for the selected application, allowing the subsystem to reliably coordinate with other energy storage components of the energy storage system via the respective subsystems.

2. The system of claim 1, which the given driver is selected for the energy storage system upon detection of the type of the energy storage component from the plurality of types of energy storage components.

3. The system of claim 2, wherein the given driver is automatically selected without use of a network connection upon recognition of a type of the energy storage component from a plurality of types of energy storage components and the detection of a wired connection to the energy storage component.

4. The system of claim 1, wherein at least a portion of the plurality of applications is stored locally in the memory.

5. The system of claim 1, wherein the plurality of energy storage components of the energy storage system require different controlling or communication protocols to communicate with the subsystem.

6. The system of claim 1, wherein the given driver enables communication with a power conversion system of the energy storage system.

7. The system of claim 1, wherein the given driver enables communication with a battery management system of the energy storage system.

8. The system of claim 1, wherein the given driver enables automation of the energy storage system.

9. The system of claim 1, wherein a given library among the set of libraries contains reference materials.

10. The system of claim 1, wherein the set of libraries include a utility rate structure library, a smart grid communication protocol library, a manufacturer operating parameters library, or a combination thereof.

11. The system of claim 1, wherein a given application among the plurality of applications is for providing an energy service or economic service.

12. The system of claim 11, wherein the energy service is selected from the group consisting of detecting energy storage device charge, ancillary services, optimum demand charge management, time of use shifting, demand shifting, demand response, energy capacity, spinning reserve capacity, ramp rate service, renewable energy firming, frequency regulation, voltage regulation, transformer unloading and management, peaking power, emergency and backup power services, and power quality services, and electric vehicle charging.

13. The system of claim 1, wherein at least one application of the plurality of applications are programmed to be implemented, with the aid of the computer processors, in accordance with adaptive rules and adaptive algorithms for achieving an objective across multiple applications and multiple energy storage components.

14. The system of claim 13, wherein the subsystem coordinates components of the energy storage system to capture value from one or more of the energy service or economic service provided by the energy storage system.

15. The system of claim 1, wherein the energy storage component is not a controller of the energy storage system.

16. The system of claim 1, wherein the given driver permits communication with only the energy storage component of the energy storage system.

* * * * *